(12) United States Patent
Lambricht

(10) Patent No.: US 10,654,750 B2
(45) Date of Patent: May 19, 2020

(54) CHEMICALLY TEMPERABLE GLASS SHEET

(71) Applicant: AGC GLASS EUROPE, Louvain-la-Neuve (BE)

(72) Inventor: Thomas Lambricht, Perwez (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 137 days.

(21) Appl. No.: 15/529,356

(22) PCT Filed: Dec. 2, 2015

(86) PCT No.: PCT/EP2015/078305
§ 371 (c)(1),
(2) Date: May 24, 2017

(87) PCT Pub. No.: WO2016/091672
PCT Pub. Date: Jun. 16, 2016

(65) Prior Publication Data
US 2018/0312430 A1   Nov. 1, 2018

(30) Foreign Application Priority Data
Dec. 9, 2014  (EP) .................................. 14197020

(51) Int. Cl.
*C03C 3/087* (2006.01)
*C03C 21/00* (2006.01)

(52) U.S. Cl.
CPC ............ *C03C 21/002* (2013.01); *C03C 3/087* (2013.01)

(58) Field of Classification Search
CPC ........ C03C 3/087; C03C 21/00; C03C 21/002
See application file for complete search history.

(56) References Cited

U.S. PATENT DOCUMENTS

| | | | |
|---|---|---|---|
| 6,461,736 B1 | 10/2002 | Nagashima et al. | |
| 2003/0114291 A1 | 6/2003 | Koyama et al. | |
| 2010/0304949 A1 | 12/2010 | Sachot et al. | |
| 2014/0227525 A1* | 8/2014 | Matsuda | C03C 21/002 428/410 |
| 2014/0248495 A1 | 9/2014 | Matsuda et al. | |
| 2014/0305502 A1 | 10/2014 | Sasai et al. | |

FOREIGN PATENT DOCUMENTS

| | | | |
|---|---|---|---|
| EP | 2 762 461 A1 | 8/2014 | |
| JP | 2007-238398 A | 9/2007 | |
| WO | WO-2008038779 A1 * | 4/2008 | ............ C03C 3/087 |
| WO | WO-2013047675 A1 * | 4/2013 | ........... C03C 21/002 |
| WO | WO-2013047676 A1 * | 4/2013 | ........... C03C 21/002 |

OTHER PUBLICATIONS

Machine Translation of JP 2007-238398 A. (Year: 2007).*
International Search Report dated Feb. 1, 2016 in PCT/EP2015/078305 filed Dec. 2, 2015.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

Chemically temperable glass sheet The invention relates to a glass sheet having a boron-, strontium- and lithium-free glass composition comprising the following in weight percentage, expressed with respect to the total weight of glass: $65 \leq SiO_2 \leq 78\%$ $8 \leq Na_2O \leq 15\%$ $1 \leq K_2O < 6\%$ $1 \leq Al_2O_3 < 3\%$ $2 \leq CaO < 10\%$ $0 \leq MgO \leq 6\%$; as well as a total iron (expressed in the form of $Fe_2O_3$) in a content ranging from 0.002 to 0.02% by weight and a $K_2O/(K_2O+Na_2O)$ ratio which is ranging from 0.1 and 0.7. The invention corresponds to an easy chemically-temperable soda-lime-silica type glass composition, which is more suited for use in electronic devices applications.

19 Claims, No Drawings

CHEMICALLY TEMPERABLE GLASS SHEET

1. FIELD OF THE INVENTION

The present invention relates to a glass sheet which is able to be chemically tempered/strengthened. In particular, the present invention relates to a glass sheet which is able to be easily chemically tempered/strengthened and which is inexpensive and easy to produce.

Chemically strengthened glass sheets are finding increasing applications in specialized glazing jobs where a mechanical resistance is required/mandatory, in a monolithic or laminated form, like transportation (i.e. aeronautical, automotive), building/architecture and display industries. Amongst such applications, the display industry has become in the several past years a huge market on demand for chemically strengthened transparent glass sheets as protective/cover glass, viewing window or (touch)screen for numerous electronic devices like mobile phones, smartphones, TV, computers, digital cameras, etc. Indeed, as many of these devices are portable, the glass used is mechanically solicited a lot and it is therefore highly desirable that it is able to tolerate impact and/or damage, such as scratches or impact, during use and transport. Chemical strengthening is even more of great importance in the domain of displays because such a domain requires glass sheets of low thickness (as low as less than 1 mm) and because chemical strengthening is known as the process of choice to mechanically reinforce (ultra-)thin glass sheets. For weight and energy transmission reasons, it is also advantageous to use thin glass sheets as cover glass for solar, thermal or photovoltaic devices, as well as insulating glazing units like double or triple glazings. For weight decrease and energy consumption savings, reinforced thin glass is also of great interest for automotive and transportation transparent glazings.

2. SOLUTIONS OF THE PRIOR ART

The chemical strengthening of a glass article is a heat induced ion-exchange, involving replacement of smaller alkali sodium ions in the surface layer of glass by larger ions, for example alkali potassium ions. Increased surface compression stress occurs in the glass as the larger ions "wedge" into the small sites formerly occupied by the sodium ions. Such a chemical treatment is generally carried out by immerging the glass in an ion-exchange molten bath containing one or more molten salt(s) of the larger ions, with a precise control of temperature and time. The rupture strength of a glass article which has been so treated is thus increased by a value approximately equal to the surface compressive stress generated.

Nevertheless, a damage capable of affecting the surface of a chemically strengthened glass during its use leads to a decrease in this strengthening effect and can even annihilate it if the damage is such that the layer under compression is penetrated. In consequence, depending on the use intended for the chemically strengthened glass, focus is made on achieving a high value of surface compressive stress (or "CS") and/or a high value of thickness of the layer under compression (which is associated with the parameter called the "depth of layer" or "DoL", namely the depth reached by the ions introduced) which ideally at least equals to the depth of the largest possible defect/damage that the glass may undergo. The combination of these two parameters are generally considered to define appropriately the quality of the resulting mechanical strength.

In particular, in the display domain, when using a "piece-by-piece process" to produce chemically strengthened glass sheets (cutting to final size is carried out before tempering treatment), a high value of DoL (i.e. >12-15 microns) and sufficient CS (i.e. >400 Mpa) is searched for edge strength, while when using a "sheet process" (cutting to final size is carried out after tempering treatment), "central tension" (defined as (CS*DoL)/(glass thickness−2*DoL)) must be kept low.

It is also known that the two strengthening parameters also depend significantly, for a given glass composition, on the conditions of temperature and time of the ion exchange process. Thus, the thickness of the layer under compression increases with the temperature and with the duration of the ion-exchange according to the known diffusion laws. But the higher the temperature, the more rapidly the stresses induced by the ion exchange relax. Likewise, extending the treatment for a too long period allows giving the stresses the necessary time to relax and thus results in a less degree of toughening. The conditions to be chosen for the process therefore reside generally in a compromise between the optimum temperature and the minimum duration, to optimize process cost and product properties.

To lower the cost of the chemical strengthening (limiting duration and/or temperature to reach searched values of compressive stress and DOL), a lot of glass compositions which are "easy chemically temperable" (meaning that they especially favour ion exchange) have been proposed (merely described or already on the market) but they generally have various drawbacks.

Many of them comprise ingredients originating from expensive raw materials and/or considerably modifying the physical properties of the glass (molten or final). Some of the chemically temperable glass compositions known contain, for example, significant contents of lithium and/or boron. However, lithium has the disadvantage of increasing the density of the glass while boron has the disadvantage to cause sometimes formation of ream by its evaporation and furnace wall/refractories corrosion. Moreover, both have the additional and significant drawback to greatly increase final glass price, due to high price of their corresponding raw materials.

Aluminosilicate-type glass compositions, such as for example those described in US Patent Application US2012/0196110 A1, the GORILLA® glass product from Corning or the DragonTrail® glass product from Asahi Glass Co., are also known to be very efficient for chemical tempering. However, they have a lot of drawbacks. Their high temperature properties make them very difficult to produce (viscosity, fining ability, forming, refractories corrosion). Their cost is relatively high due to expensiveness of some raw materials to use (i.e. alumina) and due to the high temperatures required for their production (high content of energy/fuel).

Contrary to aluminosilicate glass compositions, soda-lime-silica glass compositions are generally not considered as good candidates for easy chemically temperable compositions, even if they are by far less expensive.

Finally, it is known that it is quite difficult to modify, even slightly, a glass composition, because:

a glass production line, and in particular a float line, represents considerable investment and it is not repairable if the composition causes, for example, damages to the refractories; and the transition time while changing from a composition to another is one parameter which is of high importance when producing glass, because if long, the production cost of the final glass is drastically negatively impacted.

Accordingly, there is a demand of the market in the display domain in particular for an enable chemically temperable soda-lime-silica-type glass composition, which is more suited for mass production than aluminosilicate glass, and therefore is available at low cost, and with a base glass/matrix composition that is close to or very similar to compositions already used in existing mass production.

3. OBJECTIVES OF THE INVETION

The objective of the invention in particular is to remedy the cited disadvantages and resolving the technical problem, i.e. to provide a glass composition which is easy chemically temperable or, in other words, more favourable to ion exchange than conventional soda-lime-silica glass compositions.

Another objective of the invention in at least one of its embodiments is to provide a glass composition which is easy chemically temperable and which allows reaching strengthening parameters appropriate for a "piece-by-piece" process used to produce cover glass for display devices. In particular, an objective of the invention in such a context is to provide a glass composition which is easy chemically temperable and which allows obtaining great exchange depth (in particular $>=12$ μm), while keeping compressive stress values that result in sufficient reinforcement of glass (in particular $>=400$ MPa).

Another objective of the invention in at least one of its embodiments is to provide a glass composition which is able to limit the stress relaxation when subjecting the glass to higher temperature processes, hence allowing to achieve deeper exchange depths without impacting too negatively the compressive stresses. Another objective of the invention in at least one of its embodiments is to provide a glass composition which is easy chemically temperable and easy to produce, in particular on an existing line of production of classical soda-lime-silica glass. In particular, an objective of the invention in such a context is to provide a glass composition which is easy chemically temperable and which does not require long transition time when passing from the production of the classical soda-lime-silica composition to the temperable composition (and vice-versa,) and not requiring to use raw materials, techniques and/or industrial installations which are materially different from those which are employed for classical soda-lime-silica glass ordinary produced.

Another objective of the invention in at least one of its embodiments is to provide a glass composition which is easy chemically temperable and compatible with the float process.

Finally, another objective of the invention is to provide a solution to the disadvantages to the prior art that is simple, quick and, above all, economical.

4. OUTLINE OF THE INVENTION

The invention relates to a glass sheet having a boron-, strontium- and lithium-free glass composition comprising the following in weight percentage, expressed with respect to the total weight of glass:

65≤$SiO_2$≤78%
5≤$Na_2O$≤20%
1≤$K_2O$<8%
1≤$Al_2O_3$<6%
2≤CaO<10%

0≤MgO≤8%; as well as a total iron (expressed in the form of $Fe_2O_3$) in a content ranging from 0.002 to 0.06% by weight and a $K_2O/(K_2O+Na_2O)$ ratio which is ranging from 0.1 to 0.7.

Hence, the invention rests on a novel and inventive approach, since it enables a solution to be found for the disadvantages of prior art, in particular the disadvantages of aluminosilicate glasses while keeping, at least partially, their advantages.

The inventors have indeed found that it is possible to obtain an easy chemically temperable glass sheet which is unexpensive and easy to mass produce and limit high temperature induced stress relaxation by combining in a soda-silica glass matrix, a low alumina content and a combination of potassium and sodium ions in a ratio larger than in classical industrial glass compositions (including soda-lime-silica, the latter with typical values for that ratio below 0.1).

Throughout the present text, when a range is indicated, the extremities are included. In addition, all the integral and subdomain values in the numerical range are expressly included as if explicitly written. Also throughout the present text, the values of content as percentages are values by weight (also mentionned as wt %), expressed with respect to the total weight of the glass.

Other features and advantages of the invention will be made clearer from reading the following description of preferred embodiments given by way of simple illustrative and non-restrictive examples.

The glass sheet of the invention is made of a soda-lime-silica glass composition/matrix, comprising $SiO_2$, CaO, $Na_2O$ and $K_2O$ as the main components and further comprising MgO, $Al_2O_3$, etc.

The glass sheet of the invention is able to be chemically tempered or, in other words, ion-exchangeable/able to undergo an ion-exchange.

The glass sheet of the invention may be a glass sheet obtained by the float process, a drawing process, a rolling process or any other process known to manufacture a glass sheet starting from a molten glass composition. According to a preferred embodiment, the glass sheet is a float glass sheet. The term "float glass sheet" is understood to mean a glass sheet formed by the float process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin). Therefore, a float glass sheet can be easily distinguished from sheets obtained by other glassmaking processes, in particular by the tin oxide content which may be measured, for example, by electronic microprobe to a depth of ~10 microns. In many cases and as illustration, this content lies between 1 and 5 wt %, integrated over the first 10 microns starting from the surface.

The glass sheet according to the invention may have varied and relatively large sizes. It can, for example, have sizes ranging up to 3.21 m×6 m or 3.21 m×5.50 m or 3.21 m×5.10 m or 3.21 m×4.50 m ("PLF" glass sheet) or also, for example, 3.21 m×2.55 m or 3.21 m×2.25 m ("DLF" glass sheet).

The glass sheet according to the invention may have a thickness of from 0.1 to 25 mm. Advantageously, in the case of display applications, the glass sheet according to the invention has preferably a thickness of from 0.1 to 6 mm.

More preferably, in the case of display applications and for reasons of weight, the thickness of the glass sheet according to the invention is of from 0.1 to 2.2 mm.

According to the invention, the composition of the glass sheet is boron-free. This means that boron is not intentionally added in the glass batch/raw materials and that, if it is present, $B_2O_3$ content in the composition of the glass sheet reaches only level of an impurity unavoidably included in the production. For example, $B_2O_3$ content in the composition of the glass sheet of the invention is less than 0.01 or even better less than 0.005 wt %.

According to the invention, the composition of the glass sheet is lithium-free. This means that lithium is not intentionally added in the glass batch/raw materials and that, if it is present, $Li_2O$ content in the composition of the glass sheet reaches only level of an impurity unavoidably included in the production. For example, $Li_2O$ content in the composition of the glass sheet of the invention is less than 0.01 wt % or even better less than 0.005 wt %.

According to the invention, the composition of the glass sheet is Strontium-free. This means that the element strontium is not intentionally added in the glass batch/raw materials and that, if it is present, SrO content in the composition of the glass sheet reaches only level of an impurity unavoidably included in the production. For example, SrO content in the composition of the glass sheet of the invention is less than 0.01 wt % or even better less than 0.005 wt %.

According to the invention, the composition of the glass sheet comprises: $1 \leq Al_2O_3 < 6$ wt %. Preferably, the composition of the glass sheet comprises: $1 \leq Al_2O_3 \leq 4$ wt % and more preferably $1 \leq Al_2O_3 \leq 3$ wt %. Alternatively, the composition of the glass sheet comprises: $2 \leq Al_2O_3 \leq 4$ wt %. In the most preferred embodiment, the composition of the glass sheet comprises: $2 \leq Al_2O_3 \leq 3$ wt %.

According to the invention, the composition of the glass sheet comprises: $2 \leq CaO \leq 10$ wt %. Preferably, the composition of the glass sheet comprises: $3 \leq CaO < 10$ wt % and more preferably, $4 \leq CaO < 10$ wt %. In a very particularly preferred embodiment, the composition of the glass sheet comprises: $5 \leq CaO < 10$ wt %. In the most preferred embodiment, the composition of the glass sheet comprises: $6 \leq CaO < 10$ wt %.

According to the invention, the composition of the glass sheet comprises: $0 \leq MgO \leq 8$ wt %. Preferably, the composition of the glass sheet comprises: $0 \leq MgO \leq 7$ wt % and more preferably, $0 \leq MgO \leq 6$ wt %. In the most preferred embodiment, the composition of the glass sheet comprises: $0 \leq MgO < 5$ wt %.

According to the invention, the composition of the glass sheet comprises: $1 \leq K_2O < 8$ wt %. Preferably, the composition of the glass sheet comprises: $1 \leq K_2O < 7$ wt % and more preferably $1 \leq K_2O < 6$ wt %. In a very particularly preferred embodiment, the composition of the glass sheet comprises: $1 \leq K_2O < 5$ wt %. Alternatively, the composition of the glass sheet comprises: $2 \leq K_2O \leq 6$ wt %, or even better $3 \leq K_2O \leq 6$ wt %. In the most preferred embodiment, the composition of the glass sheet comprises: $2 \leq K_2O \leq 4$ wt %.

According to the invention, the composition of the glass sheet comprises a $K_2O/(K_2O+Na_2O)$ ratio which is ranging from 0.1 to 0.7. Preferably, the composition of the glass sheet comprises a $K_2O/(K_2O+Na_2O)$ ratio which is ranging from 0.1 to 0.6. More preferably, the composition of the glass sheet comprises a $K_2O/(K_2O+Na_2O)$ ratio which is ranging from 0.2 to 0.6. Alternatively, the composition of the glass sheet comprises a $K_2O/(K_2O+Na_2O)$ ratio which is ranging from 0.1 to 0.5 In a very particularly preferred embodiment, the composition of the glass sheet comprises a $K_2O/(K_2O+Na_2O)$ ratio which is ranging from 0.2 to 0.5. In a most preferred embodiment of the invention, the composition comprises a $K_2O/(K_2O+Na_2O)$ ratio which is ranging from 0.2 to 0.4.

According to the invention, the composition of the invention comprises a total iron (expressed in terms of $Fe_2O_3$) content ranging from 0.002 to 0.06 wt %. A total iron (expressed in the form of $Fe_2O_3$) content of less than or equal to 0.06 wt % makes it possible to obtain a glass sheet with almost no visible coloration and allowing a high degree of flexibility in aesthetic designs (for example, getting no distortion when white silk printing of some glass elements of smartphones). The minimum value makes it possible not to be excessively damaging to the cost of the glass as such, low iron values often require expensive, very pure, starting materials and also purification of these. Preferably, the composition comprises a total iron (expressed in the form of $Fe_2O_3$) content ranging from 0.002 to 0.04 wt %. More preferably, the composition comprises a total iron (expressed in the form of $Fe_2O_3$) content ranging from 0.002 to 0.02 wt %. In a very particularly preferred embodiment, the composition comprises a total iron (expressed in the form of $Fe_2O_3$) content ranging from 0.002 to 0.015 wt %.

In the most preferred embodiment, the composition comprises a total iron (expressed in the form of $Fe_2O_3$) content ranging from 0.002 to 0.01 wt %.

According to a particularly preferred embodiment, the composition of the glass sheet of the invention comprises the following in weight percentage, expressed with respect to the total weight of glass:

$65 \leq SiO_2 \leq 78\%$
$8 \leq Na_2O \leq 15\%$
$1 \leq K_2O < 6\%$
$1 \leq Al_2O_3 < 3\%$
$4 \leq CaO < 10\%$
$0 \leq MgO \leq 6\%$;

total iron (expressed in the form of $Fe_2O_3$): 0.002 to 0.02 wt %; a $K_2O/(K_2O+Na_2O)$ ratio which is ranging from 0.1 to 0.5.

According to this last embodiment, the composition of the glass sheet of the invention more preferably comprises:

$65 \leq SiO_2 \leq 78\%$
$8 \leq Na_2O \leq 15\%$
$2 \leq K_2O < 6\%$
$1 \leq Al_2O_3 < 3\%$
$6 \leq CaO < 10\%$
$0 \leq MgO \leq 6\%$;

total iron (expressed in the form of $Fe_2O_3$): 0.002 to 0.02 wt %; and a $K_2O/(K_2O+Na_2O)$ ratio which is ranging from 0.2 to 0.5.

According to this last embodiment and most preferably, the composition of the glass sheet of the invention comprises:

$65 \leq SiO_2 \leq 78\%$
$8 \leq Na_2O \leq 15\%$
$2 \leq K_2O < 4\%$
$1 \leq Al_2O_3 < 3\%$
$6 \leq CaO < 10\%$
$0 \leq MgO \leq 5\%$;

total iron (expressed in the form of $Fe_2O_3$): 0.002 to 0.02 wt %; and a $K_2O/(K_2O+Na_2O)$ ratio which is ranging from 0.2 to 0.4.

According to another embodiment, the composition of the glass sheet comprises ZnO in a content lower than 0.1 wt % Preferably, the composition of the glass sheet is free of ZnO. This means that the element zinc is not intentionally added in the glass batch/raw materials and that, if it is present, ZnO content in the composition of the glass sheet reaches only level of an impurity unavoidably included in the production.

According to another embodiment, the composition of the glass sheet comprises $ZrO_2$ in an content lower than 0.1 wt %. Preferably, the composition of the glass sheet is free of $ZrO_2$. This means that the element zirconium is not intentionally added in the glass batch/raw materials and that, if it is present, $ZrO_2$ content in the composition of the glass sheet reaches only level of an impurity unavoidably included in the production.

According to still another embodiment, the composition of the glass sheet comprises BaO in an content lower than 0.1 wt %. Preferably, the composition of the glass sheet is free of BaO. This means that the element baryum is not intentionally added in the glass batch/raw materials and that, if it is present, BaO content in the composition of the glass sheet reaches only level of an impurity unavoidably included in the production.

According to still another embodiment, the composition of the glass sheet comprises bulk $SnO_2$ in an content lower than 0.1 wt % (bulk content excluding $SnO_2$ in the "tin face" of a float glass sheet). Preferably, the composition of the glass sheet is free of bulk $SnO_2$. This means that the element tin is not intentionally added in the glass batch/raw materials and that, if it is present, bulk $SnO_2$ content in the composition of the glass sheet reaches only level of an impurity unavoidably included in the production.

According to a preferred embodiment of the invention, the composition comprises coloring components other than iron, chromium and cobalt oxides in a total content which is less than 0.005 wt %. Such an embodiment allows to control color and thus to provide a glass sheet which is neutral as mainly requested for display applications. More preferably, the composition of the invention comprises coloring components other than iron, chromium and cobalt oxides in a total content which is less than 0.003 wt %.

Advantageously, the composition of the invention may further comprise chromium and/or cobalt oxides in a total content which is between 0.001 and 0.0025 wt %. This means that the composition may comprise only chromium, only cobalt or both. Such a specific composition makes the glass especially suitable for touch technology based on IR transmission.

According to one embodiment of the invention, the glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another advantageous embodiment of the invention, the glass sheet is coated with at least one antireflection layer. This embodiment is obviously advantageous in the case of use of the glass sheet of the invention as front face of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index.

According to another embodiment, the glass sheet is coated with at least one anti-fingerprint layer or has been treated so as to reduce or prevent fingerprints from registering. This embodiment is also advantageous in the case of use of the glass sheet of the invention as front face of a touchscreen. Such a layer or such a treatment can be combined with a transparent and electrically conducting thin layer deposited on the opposite face. Such a layer can be combined with an antireflection layer deposited on the same face, the anti-fingerprint layer being on the outside of the stack and thus covering the antireflection layer.

According to still another embodiment, the glass sheet is coated with at least one layer or has been treated so as to reduce or prevent glaring and/or sparkling. This embodiment is of course advantageous in the case of use of the glass sheet of the invention as front face of a display device. Such an anti-glare or anti-sparkling treatment is for example an acid-etching treatment producing a specific roughness of the treated face of the glass sheet.

According to the applications and/or properties desired, other layer(s)/treatment(s) can be deposited/done on one and/or the other face of the glass sheet according to the invention.

According to still another embodiment, the glass sheet, if produced by the float method, is treated as to prevent warpage after chemical tempering. This embodiment is advantageous in the case of (very) thin glass, where the deformation due to asymmetric stress profiles can be large and requires expensive operations to be compensated (extralamination, bonding, . . . ).

This treatment can be but is not limited to polishing, etching, semi-permeable layer deposition (CVD, magnetron sputtering), specific dealkalinization process, aso.

The invention also relates to a glass sheet according to the invention which is chemically tempered. All previously described embodiments and preferred composition ranges also apply to the invention of chemically tempered glass sheet.

Finally, the invention also relates to the use of the chemically tempered glass sheet according to the invention in an electronic device. Similarly the invention relates as well to the use of the chemically tempered glass sheet according to the invention in an automotive glazing where it can allow significant gain in weight and/or safety. In solar energy converters (thermal, photovoltaic, . . . ), the use of very thin low-iron chemically tempered glass sheet is especially interesting as it allows lower energy loss in the cover, higher mechanical resistance and/or flexible design. Therefore, the invention relates as well to the use of the chemically tempered glass sheet according to the invention in Solar energy converters. Finally, The invention relates to the use of the chemically tempered glass sheet according to the invention or in a building insulating glazing unit, where it allows significant weight reduction and increase of natural energy gain in the buildings.

Embodiments of the invention will now be further described, by way of examples only, together with some comparative examples, not in accordance with the invention. The following examples are provided for illustrative purposes, and are not intended to limit the scope of this invention.

EXAMPLES

Powder raw materials were mixed together and placed in melting crucibles, according to the compositions specified in the following table. The raw material mix was then heated up in an electrical furnace to a temperature allowing complete melting of the raw material.

In the first series (example 1.x), the base molar composition was kept constant, and the proportion between $Na_2O$ and $K_2O$ was varied in the range of the invention while keeping constant the molar fraction of alkali ($Na_2O+K_2O \sim 13.3$ mol %) over the total composition. The first example is a comparative sample, similar to state of the art float composition.

In the second series (example 2.x.x), the molar composition in $SiO_2$ and $Al_2O_3$ was kept constant. The molar fraction of total alkali ($Na_2O+K_2O$ 13.3 mol %) and total alkali-earth ($MgO+CaO \sim 15$ mol %) were as well kept constant, but the proportion between $K_2O$ and $Na_2O$ and between MgO and CaO were varied. As replacement of CaO by MgO is known to improve DoL, 3 levels of CaO/MgO (examples 2.1.x, 2.2.x and 2.3.x) were tested to show the beneficial impact of an improved $K_2O/(K_2O+Na_2O)$ ratio over a large range of composition. For each sub-series, the first example is a comparative sample with a classical $K_2O/(K_2O+Na_2O)$ ratio.

The third serie (example 3.x) is similar to the serie 2.2, but with a higher content of $Al_2O_3$. Here again, the first example (3.1) is a comparative sample, with a classical $K_2O/(K_2O+Na_2O)$

| Wt % | Ex. 1.1 | Ex. 1.2 | Ex. 1.3 | Ex. 1.4 |
|---|---|---|---|---|
| $SiO_2$ | 71.9 | 71.7 | 71.3 | 70.6 |
| $Al_2O_3$ | 1.1 | 1.1 | 1.2 | 1.2 |
| CaO | 8.1 | 7.8 | 7.1 | 6.7 |
| MgO | 4.0 | 4.0 | 4.2 | 4.3 |
| $Na_2O$ | 14.3 | 13.3 | 11.3 | 9.4 |
| $K_2O$ | 0.2 | 1.7 | 4.6 | 7.4 |
| $Fe_2O_3$ | 0.038 | 0.034 | 0.031 | 0.030 |
| $K_2O/(Na_2O + K_2O)$ | 0.01 | 0.11 | 0.29 | 0.44 |

| Wt % | Ex. 2.1.1 | Ex. 2.1.2 | Ex. 2.1.3 | Ex. 2.2.1 | Ex. 2.2.2 | Ex. 2.2.3 | Ex. 2.3.1 | Ex. 2.3.2 | Ex. 2.3.3 |
|---|---|---|---|---|---|---|---|---|---|
| $SiO_2$ | 71.8 | 71.6 | 70.9 | 72.0 | 71.7 | 71.0 | 73.0 | 72.7 | 71.4 |
| $Al_2O_3$ | 1.1 | 1.1 | 1.2 | 1.1 | 1.2 | 1.2 | 1.1 | 1.2 | 1.2 |
| CaO | 8.1 | 7.8 | 6.5 | 7.2 | 6.9 | 5.7 | 3.4 | 3.3 | 2.8 |
| MgO | 4.1 | 4.2 | 4.2 | 4.7 | 4.8 | 4.8 | 7.1 | 7.2 | 7.3 |
| $Na_2O$ | 14.3 | 13.3 | 9.3 | 14.4 | 13.4 | 9.4 | 14.8 | 13.7 | 9.6 |
| $K_2O$ | 0.2 | 1.7 | 7.6 | 0.2 | 1.7 | 7.6 | 0.2 | 1.7 | 7.6 |
| $Fe_2O_3$ | 0.034 | 0.003 | 0.027 | 0.035 | 0.032 | 0.028 | 0.034 | 0.033 | 0.028 |
| $K_2O/(Na_2O + K_2O)$ | 0.01 | 0.11 | 0.45 | 0.01 | 0.11 | 0.45 | 0.01 | 0.11 | 0.44 |

| | Ex. 3.1 | Ex. 3.2 | Ex. 3.3 |
|---|---|---|---|
| $SiO_2$ | 70.4 | 69.9 | 68.7 |
| $Al_2O_3$ | 3.1 | 3.1 | 3.2 |
| CaO | 7.3 | 6.9 | 5.9 |
| MgO | 4.8 | 4.7 | 4.8 |
| $Na_2O$ | 14.2 | 13.4 | 9.4 |
| $K_2O$ | 0.2 | 1.7 | 7.6 |
| $Fe_2O_3$ | 0.0 | 0.0 | 0.0 |
| $K_2O/(Na_2O + K_2O)$ | 0.01 | 0.11 | 0.45 |

After the melting and the homogenization of the composition, the glass was cast in several small samples of 40*40 mm and annealed in an annealing furnace. Subsequently, the samples were polished up to a surface state similar to floated glass (mirror polishing). Several samples were produced for each composition, in order to allow to perform different tempering treatment for each composition.

Chemical Tempering

The samples prepared in above section were chemically tempered under two different tempering conditions, and for each of them the different samples were treated at the same time and in the same conditions. The samples of different compositions were placed in a cassette, preheated and then dippen in a molten $KNO_3$ (>99%) bath. After the ion exchange, the samples were cooled down and washed.

Two types of treatments were applied on the different glass compositions. The first one was carried out at 420° C. during an immersion time of 220 minutes (so called "low temperature"). The second one was carried out at 465° C. during 480 minutes (so called "high temperature"). Subsequently the surface compressive stress (CS) and the depth of exchanged layer (DoL) were measured via photoelasticimetry. The following table summarize the average value of CS and DoL for 3 random samples of each composition and each treatment.

| | Ex. 1.1 | Ex. 1.2 | Ex. 1.3 | Ex. 1.4 |
|---|---|---|---|---|
| $CS_{465°\ C.}$ (MPa) | 501 | 523 | 481 | 427 |
| $DOL_{465°\ C.}$ (μm) | 21.4 | 25.4 | 31.6 | 37.9 |
| $CS_{420°\ C.}$ (MPa) | 747 | 706 | 588 | 495 |
| $DOL_{420°\ C.}$ (μm) | 8.6 | 9.7 | 13.0 | 16.1 |

|  | Ex. 2.1.1 | Ex. 2.1.2 | Ex. 2.1.3 | Ex. 2.2.1 | Ex. 2.2.2 | Ex. 2.2.3 | Ex. 2.3.1 | Ex. 2.3.2 | Ex. 2.3.3 |
|---|---|---|---|---|---|---|---|---|---|
| $CS_{465° C.}$ (MPa) | 502 | 541 | 417 | 511 | 527 | 438 | 537 | 468 | 425 |
| $DOL_{465° C.}$ (μm) | 20.8 | 22.5 | 37.7 | 21.7 | 27.4 | 38.8 | 31.6 | 34.9 | 51.2 |
| $CS_{420° C.}$ (MPa) | 740 | 687 | 462 | 749 | 697 | 471 | 743 | 695 | 465 |
| $DOL_{465° C.}$ (μm) | 8.4 | 9.3 | 16.0 | 9.0 | 10.2 | 16.7 | 13.0 | 14.3 | 23.9 |

|  | Ex. 3.1 | Ex. 3.2 | Ex. 3.3 |
|---|---|---|---|
| $CS_{465° C.}$ (MPa) | 579 | 585 | 450 |
| $DOL_{465° C.}$ (μm) | 18.9 | 25.5 | 41.3 |
| $CS_{420° C.}$ (MPa) | 827 | 722 | 501 |
| $DOL_{420° C.}$ (μm) | 8.2 | 9.8 | 18.8 |

Based on the measured values of the chemical tempering properties (CS and DoL), the ratio R between the high temperature and low temperature compressive stresses can be computed: R=CS465° C./CS420° C. This R ratio is an image of the surface compressive stress preservation at high temperature. A value of R close to 1 means that the glass tends to limit stress relaxation at high temperature, and that low and high temperature treatment finally yields the same level of compressive stress. On the other hand if the R ratio is small, it means that the glass submitted to a high temperature treatment tends to relax the generated stresses to a large extent. The gain in DoL (G factor) can also be computed for each composition according to the invention by using the corresponding comparative sample: G= $(DOL_{sample}-DOL_{comparative})/DOL_{comparative}$. This G factor has to be as high as possible in order to improve the resistance of the glass pieces versus mechanical solicitations. The R ratios and G factors for the different compositions are summarized in the following table.

|  | Ex. 1.1 | Ex. 1.2 | Ex. 1.3 | Ex. 1.4 |
|---|---|---|---|---|
| $K_2O/(Na_2O + K_2O)$ | 0.01 | 0.11 | 0.29 | 0.44 |
| R ($CS_{465° C.}/CS_{420° C.}$) | 0.67 | 0.74 | 0.82 | 0.86 |
| $G_{465° C.}$ (Dol improvement) | 0% | 19% | 48% | 77% |
| $G_{420° C.}$ (Dol improvement) | 0% | 13% | 51% | 86% |

|  | Ex. 2.1.1 | Ex. 2.1.2 | Ex. 2.1.3 | Ex. 2.2.1 | Ex. 2.2.2 | Ex. 2.2.3 | Ex. 2.3.1 | Ex. 2.3.2 | Ex. 2.3.3 |
|---|---|---|---|---|---|---|---|---|---|
| $K_2O/(Na_2O + K_2O)$ | 0.01 | 0.11 | 0.45 | 0.01 | 0.11 | 0.45 | 0.01 | 0.11 | 0.44 |
| R ($CS_{465° C.}/CS_{420° C.}$) | 0.68 | 0.79 | 0.90 | 0.68 | 0.76 | 0.93 | 0.72 | 0.67 | 0.91 |
| $G_{465° C.}$ (Dol improvement) | 0% | 8% | 81% | 0% | 26% | 79% | 0% | 10% | 62% |
| $G_{420° C.}$ (Dol improvement) | 0% | 10% | 90% | 0% | 13% | 86% | 0% | 10% | 84% |

|  | Ex. 3.1 | Ex. 3.2 | Ex. 3.3 |
|---|---|---|---|
| $K_2O/(Na_2O + K_2O)$ | 0.01 | 0.11 | 0.45 |
| R ($CS_{465° C.}/CS_{420° C.}$) | 0.70 | 0.81 | 0.90 |
| $G_{465° C.}$ (Dol improvement) | 0% | 35% | 118% |
| $G_{420° C.}$ (Dol improvement) | 0% | 19% | 128% |

From the above tables, the beneficial effect of the invention is highlighted. By increasing the $K_2O/(K_2O+Na_2O)$ ratio while keeping the rest of the composition stable on a molar point of view, the G factors (420° C. and 465° C.) of the composition increase significantly, meaning that the composition according to the invention allows faster ion exchange at the two tested temperatures.

Similarly, the R ratio increases with higher values of $K_2O/(K_2O+Na_2O)$, highlighting the effect of stress conservation for high temperature treatment. In this set of experiment, the comparative samples present a R ratio around 0.7, meaning that increasing the treatment temperature from 420° C. to 465° C. will reduce the surface compressive stress by 30%. On the other side, samples according to the invention present a R ratio up to 0.9, meaning that the higher temperature treatment only reduces the compressive stress by 10% with respect to low temperature treatment.

By this way, interesting combinations of DoL (up to 50 μm) and CS (kept higher than 400 MPa) can be obtain with the composition according to the invention, by applying higher temperature treatments.

The invention claimed is:

1. A glass sheet having a boron-, strontium- and lithium-free glass composition, and comprising the following in weight percentage, expressed with respect to the total weight of glass:
   65≤$SiO_2$≤78%;
   5≤$Na_2O$≤20%;
   2≤$K_2O$<8%;
   1≤$Al_2O_3$<6%;
   2≤CaO<10%; and
   0≤MgO≤8%;
   as well as a total iron content, expressed in the form of $Fe_2O_3$, ranging from 0.027% to 0.06% by weight and a $K_2O/(K_2O+Na_2O)$ ratio which is from 0.2 to 0.62.

2. The glass sheet according to claim 1, further comprising alumina in a content such that 1≤$Al_2O_3$≤4 wt %.

3. The glass sheet according to claim 1, further comprising alumina in a content such that 2≤$Al_2O_3$≤3 wt %.

4. The glass sheet according to claim 1, wherein 5≤CaO<10 wt %.

5. The glass sheet according to claim 1, wherein 2≤$K_2O$<6 wt %.

6. The glass sheet according to claim 1, wherein 3≤$K_2O$≤6 wt %.

7. The glass sheet according to claim 1, wherein 0≤MgO≤6 wt %.

8. The glass sheet according to claim 1, wherein the $K_2O/(K_2O+Na_2O)$ ratio is from 0.2 to 0.6.

9. The glass sheet according to claim 1, wherein the $K_2O/(K_2O+Na_2O)$ ratio is from 0.2 to 0.5.

10. The glass sheet according to claim 1, wherein the $K_2O/(K_2O+Na_2O)$ ratio is from 0.2 to 0.4.

11. The glass sheet according to claim 10, comprising the following in weight percentages, expressed with respect to the total weight of glass:
   $65 \leq SiO_2 \leq 78\%$;
   $8 \leq Na_2O \leq 15\%$;
   $2 \leq K_2O < 4\%$;
   $1 \leq Al_2O_3 < 3\%$;
   $6 \leq CaO < 10\%$; and
   $0 \leq MgO \leq 5\%$.

12. The glass sheet according to claim 1, which is chemically tempered.

13. The glass sheet according to claim 12, having a surface and a layer under compressive stress extending from the surface to a depth of the layer, wherein the depth of the layer is at least 7 μm and the compressive stress is at least 400 MPa.

14. An electronic device, automotive glazing, solar energy converter or insulation glazing unit comprising the glass sheet according to claim 1.

15. The glass sheet according to claim 12, wherein the glass sheet has a R ratio of from 0.74 to 0.91 where $R=CS_{465° C.}/CS_{420° C.}$ and CS refers to compressive stress at the indicated temperature.

16. The glass sheet according to claim 12, having a surface and a layer under compressive stress extending from the surface to a depth of the layer, wherein the depth of the layer is at least 10 μm after treatment of the glass for 220 minutes at 420° C.

17. A glass sheet having a boron-, strontium- and lithium-free glass composition, and comprising the following in weight percentages, expressed with respect to the total weight of glass:
   $65 \leq SiO_2 \leq 78\%$;
   $8 \leq Na_2O \leq 15\%$,
   $2 \leq K_2O < 6\%$;
   $2 \leq Al_2O_3 < 6\%$;
   $4 \leq CaO < 10\%$; and
   $0 \leq MgO \leq 6\%$;
   as well as a total iron content, expressed in the form of $Fe_2O_3$, ranging from 0.002 to 0.06% by weight, a total content of chromium and/or cobalt oxides ranging from 0.001 to 0.0025 wt %, and a $K_2O/(K_2O+Na_2O)$ ratio which is from 0.2 to 0.43.

18. A glass sheet having a boron-, strontium- and lithium-free glass composition, and comprising the following in weight percentages, expressed with respect to the total weight of glass:
   $65 \leq SiO_2 \leq 78\%$;
   $5 \leq Na_2O \leq 20\%$,
   $2 \leq K_2O < 8\%$;
   $1 \leq Al_2O_3 < 6\%$;
   $2 \leq CaO < 10\%$; and
   $0 \leq MgO \leq 8\%$;
   as well as a total iron content, expressed in the form of $Fe_2O_3$, ranging from 0.002 to 0.06% by weight; a total content of coloring components other than iron, chromium and cobalt oxides ranging from greater than 0 to less than 0.005 wt %, and a $K_2O/(K_2O+Na_2O)$ ratio which is from 0.2 to 0.62.

19. The glass sheet according to claim 18, comprising a total content of chromium and/or cobalt oxides ranging from 0.001 to 0.0025 wt % of the glass.

* * * * *